United States Patent
Armellin et al.

[11] Patent Number: 6,070,631
[45] Date of Patent: *Jun. 6, 2000

[54] HIGH-TRANSVERSE-CURVATURE TIRE, IN PARTICULAR FOR FRONT WHEELS OF MOTOR-VEHICLES

[75] Inventors: Giancarlo Armellin, Nova Milanese, Italy; Peter Kronthaler, München, Germany

[73] Assignee: Pirelli Coordinamento Pneumatici SPA, Milan, Italy

[*] Notice: This patent is subject to a terminal disclaimer.

[21] Appl. No.: 08/890,039

[22] Filed: Jul. 9, 1997

[30] Foreign Application Priority Data

Jul. 29, 1996 [IT] Italy .................................. MI96A1614

[51] Int. Cl.$^7$ ................. B60C 3/00; B60C 9/18; B60C 9/22; B60C 11/03
[52] U.S. Cl. .................. 152/209.11; 152/209.24; 152/454; 152/458; 152/526; 152/527; 152/531; 152/533; 152/536; 152/540; 152/903
[58] Field of Search .................. 152/209.11, 209.24, 152/903, 454, 458, 526, 527, 531, 533, 536, 540

[56] References Cited

U.S. PATENT DOCUMENTS

| | | |
|---|---|---|
| 2,104,532 | 1/1938 | Sommer ........................ 152/209.11 X |
| 4,112,994 | 9/1978 | Mills et al. . |
| 4,140,168 | 2/1979 | Caretta . |
| 4,293,019 | 10/1981 | Maiocchi . |
| 5,032,198 | 7/1991 | Kojima et al. . |
| 5,355,926 | 10/1994 | Takase . |
| 5,358,020 | 10/1994 | Haas ................................... 152/209.11 |
| 5,396,943 | 3/1995 | Takase . |
| 5,407,006 | 4/1995 | Giancola et al. . |
| 5,562,792 | 10/1996 | Caretta . |
| 5,902,425 | 5/1999 | Armellin ............................ 152/531 X |

FOREIGN PATENT DOCUMENTS

| | | |
|---|---|---|
| 0 235 579 | 9/1987 | European Pat. Off. ............... 152/531 |
| 329589 | 8/1989 | European Pat. Off. . |
| 346047 | 12/1989 | European Pat. Off. . |
| 561326 | 9/1993 | European Pat. Off. . |
| 565339 | 10/1993 | European Pat. Off. . |
| 718122 | 6/1996 | European Pat. Off. . |
| 756949 | 2/1997 | European Pat. Off. . |
| 56-71604 | 6/1981 | Japan . |
| 2157239 | 10/1985 | United Kingdom . |
| 2283215 | 5/1995 | United Kingdom . |

*Primary Examiner*—Adrienne C. Johnstone
*Attorney, Agent, or Firm*—Stevens, Davis, Miller & Mosher, LLP

[57] ABSTRACT

A high-transverse-curvature tire (1), in particular to be mounted on the front wheel of a motor-vehicle, comprises a belt structure (6) including, in a radially external layer (9a), a plurality of circumferential coils (7a), axially arranged side by side, of a cord (7) wound at a substantially zero angle with respect to the equatorial plane (X—X) of the tire. The area occupied by rubber blocks (10) formed in a portion of the tread band (8) having a length equal to the pitch (p) of the tread pattern and a width equal to the axial development of the tread band (8), is between 70% and 90% of the total area of said portion.

29 Claims, 5 Drawing Sheets

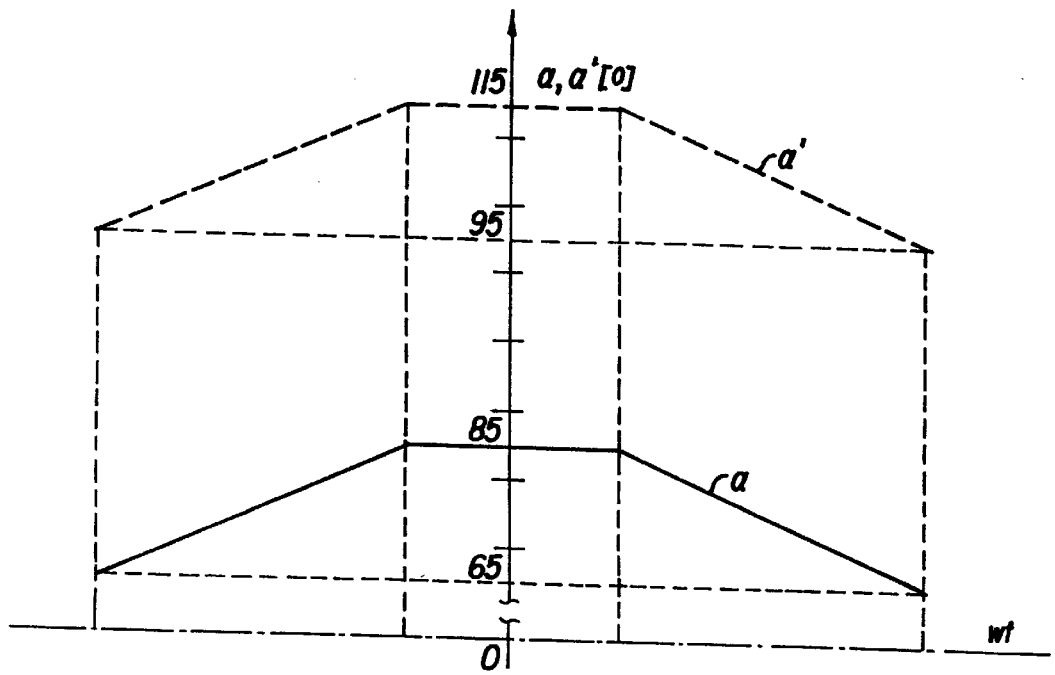
FIG. 5
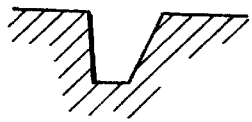  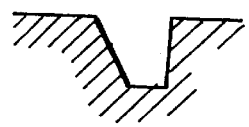  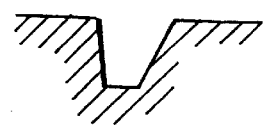
FIG. 6A   FIG. 6B   FIG. 6C

HIGH-TRANSVERSE-CURVATURE TIRE, IN PARTICULAR FOR FRONT WHEELS OF MOTOR-VEHICLES

FIELD OF THE INVENTION

The present invention relates to a high-transverse-curvature tire, having a curvature ratio not lower than 0.3, in particular for use in motor-vehicles, comprising:

a carcass structure of toric form having a high transverse curvature and provided with a central crown portion and two sidewalls ending in a couple of beads for anchoring onto a corresponding mounting rim;

a belt structure, circumferentially inextensible, coaxially extended around the carcass structure;

a tread band coaxially extended around the belt carcass and comprising a plurality of rubber blocks defined between a plurality of grooves extending along a direction substantially transverse to the running direction of the tire, the tread band being free from any groove extending along a direction substantially parallel to the running direction of the tire, said grooves comprising a bottom connected to opposite inlet and outlet sidewalls extending substantially perpendicularly to said bottom.

In the following description and in the appended claims, the expression: "sidewalls substantially perpendicular to the groove bottom" is used to indicate walls that form—with respect to a plane perpendicular to the bottom—an angle varying from 0° to 40°.

More particularly, the invention relates to a front tire for two-wheeled motor-vehicles, wherein the high transverse curvature is defined by particular values of the ratio between the height of the tread crown from the line passing through the tread axial ends or "camber" of the tread band, said line being measured at the equatorial plane, on the one hand, and the distance between said tread band ends on the other hand. Said value, preferably not lower than 0.3, is anyhow higher than the value related to the corresponding rear tire, usually not lower than 0.15.

In the following description and in the appended claims, said ratio will be indicated by the term: "curvature ratio".

As is known, tires for two-wheeled vehicles have been manufactured for a long time with a carcass structure comprising a couple of plies of rubberized fabric reinforced with cords symmetrically inclined with respect to the tire equatorial plane, which structure is usually known as cross-plies carcass, and possibly a belt structure also comprising couples of strips of rubberized fabric provided with cords inclined with respect to the tire equatorial plane.

While such tire structure could ensure an extremely regular curve holding of the motor-vehicle, the use of this type of tires involved problems of comfort, stability, road holding of the vehicle and weariness of the driver, due to their excessive stiffness.

BACKGROUND DISCUSSION

The structure of these tires, in fact, accumulated—under the effect of an imposed deformation—elastic energy which was given back almost instantaneously upon termination of the stress, amplifying the unevennesses transmitted by the road surface layer, with ensuing stability loss of the vehicle.

In particular, during the straightaway running such excessive stiffness causes, at low speeds, high frequency (8–10 Hz) oscillations on the front tire (shimmy effect), causing driving to be precarious.

To try to obviate these problems, it has recently been proposed in U.S. Pat. No. 5,975,175, the use of a radial-ply tire provided with a belt structure comprising circumferentially-oriented cords, preferably metal cords, also indicated by the term: zero-degree cords.

This type of tire has unquestionably improved the situation in terms of comfort and driving stability: in fact, the oscillations of the vehicle at straightaway high speeds have disappeared and in particularly the shimmy effect has been substantially eliminated.

However, even if improvements as to the comfort and reduction of the driver's weariness have been achieved, the tires of the aforesaid type have not allowed, at least so far, neither to improve the wet grip of the vehicle nor to increase the wear resistance and, consequently, the kilometric yield of the tread band.

SUMMARY OF THE INVENTION

According to the present invention, the inventors have now realized that the problem of achieving such desired characteristics can be solved by combining a belt structure having zero-degree cords and a particular pattern of the tire tread, such as to provide a given ratio between the area occupied by the rubber blocks and the area occupied by the grooves (or solid/hollow area ratio).

Therefore, the present invention provides a tire of the type indicated hereinabove, which is characterized in that:

a) said belt structure comprises at least a radially external layer including a plurality of circumferential coils, axially arranged side by side, of a cord wound at a substantially zero angle with respect to the equatorial plane of the tire; and in that b) the area occupied by said rubber blocks in a portion of tread band having a length equal to a pitch of the tread pattern and a width equal to the axial development of the tread band is between 70% and 90% of the total area of said portion.

According to the invention, the Applicant has found that by adopting a belt structure with zero-degree cords it is possible to obtain a higher degree of freedom in the design of the tread pattern, substantially overcoming the limit represented by the need of having a large solid area (i.e. a large area occupied by the rubber blocks) to ensure an adequate wear resistance of the tire.

According to the invention, in fact, it has surprisingly been found that by adopting a belt structure with zero-degree cords, it is possible to reduce the area of the rubber blocks, and therefore the solid/hollow area ratio, with respect to that of the tires of the prior art without affecting the wear resistance of the tire and achieving at the same time the following important advantages:

a) an improvement of tire capacity of draining off the water present under the tire ground-contacting area (aquaplaning);

b) an improvement of shimmy behavior of the tire in spite of the presence of a greater hollow area under the tire ground-contacting area;

c) maintenance of a high directional stability of the tire, whatever the use conditions, and especially while traveling over a curvilinear path;

d) an improvement of braking behavior of the vehicle with a reduction of the vehicle braking distance.

More particularly, according to the invention, such characteristics are achievable when, as indicated hereinabove, the area occupied by the rubber blocks formed in a portion of the tread band having a length equal to the pitch of the tread pattern and a width equal to the axial development of the tread band, is between 70% and 90% of the total area of said portion.

In the following description and in the appended claims, the term: axial development of the tread band, is used to indicate the extension in width of the latter as measured along the peripheral surface of the tire.

In the following description and in the appended claims, the term: pitch of the tread pattern, is used to indicate the length, measured along the circumferential development of the tread band, of a portion of the tread pattern which periodically repeats for a finite number "n" of times throughout the whole circumferential development of the tread band.

In the present case, therefore, the pitch of the tread pattern is equal to the distance between the starting points of two subsequent repetitive portions of the tread pattern, measured along the circumferential development of the tread band.

Preferably, the solid area is between 80% and 85%, and, still more preferably, it is equal to about 83% of the total area of said portion having a length equal to the pitch of the tread pattern and a width equal to the axial development of the tread band.

Advantageously, furthermore, the adoption of a belt structure with zero-degree cords in a radially external layer of the same allows to increase both the directional stability and the tire ground-contacting area, i.e. the area where the tire gets in touch with the ground, in any use condition of the tire.

Thanks to this feature, both the stresses due to sliding on the road and the stresses due to hysteresis dissipation in the rubber composition of the tread band are reduced, with an advantageous increase in wear resistance of the tire.

Preferably, the cord coils comprise high elongation cords made from high carbon content steel wires.

Alternatively, the cord coils may comprise aramidic textile cords.

Preferably, furthermore, the cord coils arranged at a substantially zero-degree angle with respect to the equatorial plane of the tire are distributed with variable density along the axial development of the belt structure.

According to this embodiment of the invention, the distribution density of the cord coils changes progressively along the belt structure, preferably progressively increasing from the equatorial plane towards the ends of the belt structure according to a predetermined relation.

In this way, it is advantageously possible to obtain a belt structure which is at the same time flexible in the middle, to absorb and damp the vibrations due to the ground roughness, and rigid at the sides, to develop high slip thrusts.

In accordance with the experiments of the Applicant, such relation may conveniently have the following expression:

$$Nx = K \frac{R^2}{r^2} No$$

wherein:

No is the number of cord coils arranged in a central portion of unitary length located on either side the equatorial plane;

R is the distance between the center of said portion and the rotation axis of the tire;

r is the distance between the center of the unitary portion between the equatorial plane and the axial ends of said radially external layer and the rotation axis of the tire;

K is a parameter that takes into account the constituent material and the cord formation, as well as the amount of rubber around the cord and the weight of the radially-internal layer portion at said unitary portion, which is variable with variations in the material type and structural features of the belt strips along the crown profile that diverge from a reference value.

This parameter K may take a value substantially close to 1 if the cords have the same formation and all the connected materials are the same throughout the layers, or different values according to variations in the materials and formation of the reinforcing elements along the peripheral extension of the belt structure.

A distribution of the cords in accordance with such relation ensures both the uniformity of the stress acting on the belt structure during use of the tire, as a consequence of the centrifugal force applied, and the necessary differentiated stiffness along the axial direction.

Clearly, those skilled in the art may find other relations which, according to the aforementioned design variables, would allow to achieve at the same time a differentiated stiffness along the axial direction and a stress uniformity in the belt structure of the running tire, by varying in a controlled manner the density of the above cords.

Preferably, the winding density of the cords at zero-degree in the area located on either side of the equatorial plane, where the maximum thinning out takes place, is not greater than 8 and more preferably is between 3 and 6 cords/cm.

The axial width of said zone varies preferably from 10% to 30% of the axial development of the belt.

Preferably, the quantity of cords in said central area is equal to a value between 60% and 80% of the quantity of cords near the tire shoulders, where the density of said cords is preferably not greater than 10 and more preferably included between 6 and 8 cords/cm.

The cord coils of the aforesaid radially external layer are wound on a reinforcing layer in a radially internal position, which, in a preferred embodiment, is essentially consisting of a sheet of elastomeric material placed between said cord coils and the carcass ply, possibly filled with binding agents dispersed in said material.

Preferably, said binding agents comprise reinforcing fibrous fillers of a material selected from the group comprising: textile, metal and glass fibers or short fibrillated aramid fibers, randomly arranged or oriented according to a preferred direction, inclined with respect to said equatorial plane.

Preferably, said reinforcing fibrous fillers are homogeneously distributed in said elastomeric matrix with a density per volume unit of from 0.5% to 5% of the total volume.

Still more preferably, the reinforcing fibrous fillers are short fibers formed with fibrils of aramid homogeneously distributed in the sheet of elastomeric material in a quantity of from 1 and 10 parts by weight per 100 parts by weight of elastomer (phr).

According to a further embodiment, the radially internal layer may comprise two strips axially arranged side by side, provided with reinforcing elements oriented according to inclined directions in each strip and opposite to one another in the two strips with respect to the equatorial plane of the tire.

Alternatively, the radially internal layer may comprise two radially superposed strips provided with reinforcing elements parallel to one another in each strip and crossed with the elements of the adjacent strip, symmetrically inclined with respect to the equatorial plane of the tire; in this case, the reinforcing elements in one of said strips can be of a different material from that of the reinforcing elements of the radially adjacent strip.

Conveniently, the reinforcing elements of said radially internal layer are selected from the group comprising textile cords and metal cords.

Advantageously, and in any embodiment, said radially internal layer may be interrupted in correspondence of the equatorial plane for a portion of width preferably ranging from 10% to 30% of the axial development of said belt.

In a preferred embodiment of the present invention, the grooves transversely extend along the tread band according to a curvilinear path substantially parallel to the so-called wear waves (also known by the term "Schlamack waves", after the name of the researcher who has theorized the phenomenon) of the tread band.

Such a conformation of the grooves, in fact, advantageously allows to reduce the wear of the tread band and contributes to reduce the tire noise during running of the vehicle.

Preferably, just to better follow the aforesaid wear waves, the grooves have at least a curvature center positioned upstream of the same at the opposite side zones of the tread band, external to said equatorial zone.

In such side zones, the grooves preferably have a curvature radius of from 120 to 180 mm.

Preferably, the tire of the present invention comprises at least a groove substantially extending throughout the whole axial development of the tread band according to a substantially double-inflection curvilinear path, including opposite lateral portions having their respective curvature centers positioned upstream of the groove and on opposite sides with respect to said equatorial plane of the tire.

Also in this case, the opposite lateral portions of such a groove preferably have a curvature radius of from 120 to 180 mm.

Preferably, furthermore, at least one of the lateral portions of such double-inflection path groove transversely extends along the tread band through substantially the whole width of the equatorial zone of the tire and the whole width of one of said side zones of the tread band.

Preferably, said opposite lateral portions of the groove having a double-inflection path are connected through an intermediate portion, having a curvature center positioned downstream of the groove, extending externally to the equatorial zone and in at least a part of one of the side zones of the tire tread.

Preferably, such intermediate connecting portion has a curvature radius of from 20 to 40 mm.

According to this embodiment of the invention, the grooves having a double-inflection path act as connecting elements between grooves formed in opposite parts of the tread band and shaped according to the wear waves.

Advantageously, the double-inflection grooves, not only optimize the wear of the tread band in terms of uniformity and reduction of wear velocity, but also contribute to a still more effective evacuation of the water present under the tire ground-contacting area.

In this way, the draining capacity of the tire improves to such an extent that, when it is mounted on the front wheel of a motor-vehicle, the rear tire travels on a "track" substantially free from water.

According to a further embodiment of the present invention, particularly preferred in case of high performance tires, in an equatorial zone of the tire the outlet wall of the grooves is inclined with respect to their bottom towards a direction opposite to the running direction of the tire and forms with respect to a plane ($\pi$) tangent to said bottom an angle ($\alpha'$) of from 100° to 130°.

In the following description and in the appended claims, the terms: "inlet" and "outlet" are used to indicate—with reference to the structural features of the grooves—the parts of the grooves which are stressed first or get in touch first with the ground during tire rolling and, respectively, the parts of the grooves that are stressed after a predetermined angular rotation of the wheel.

In the same way, in the following description and in the appended claims, the terms: "upwards" and "downwards" are used to indicate—with reference to the position of the grooves—those parts of the tread band, for instance the rubber blocks, that are stressed or get in touch with the ground during the tire rolling before and, respectively, after said grooves.

In the following description and in the appended claims, furthermore, all the angular values measured, starting from a plane ($\pi$) tangent to the groove bottom will be measured in counterclockwise direction.

According to the invention, when the value of angle $\alpha'$ formed by the inlet wall of the grooves is within the range of values mentioned hereinabove, it has been noticed a rigidity increase of the rubber blocks positioned downwards of the grooves in the very zone of the tread band subject to greater stresses during running of the vehicle and in particular during braking, with a substantial reduction of wear phenomena and a simultaneous achievement of a more uniform wear of the tread band.

Thanks to this conformation of the grooves outlet walls, the following additional advantages have also been achieved:

a) possibility of reducing the weight of the tire and, along therewith, of reducing both the disturbing effects on vehicle trim caused by impacts or ground roughness and the braking distance because of the lower inertia of the tire;

b) an increase in braking capacity of the tire, which allows a further reduction of the braking distance of the vehicle;

c) a greater wear uniformity of the tire tread, with an ensuing advantageous increase in road holding of the same;

d) a lower rolling resistance of the tire, with an ensuing consumption reduction.

Preferably, the angle $\alpha'$ is between 110° and 120° and still more preferably, it is equal to about 115°: in fact, an optimum rigidity of the rubber blocks positioned downstream of the grooves has been found within such range of values, while above 130° the tire has shown an undesired and progressive loss of grip, a wear increase and rolling unevenness.

Preferably, the equatorial zone of the tread band interested by the desired inclination of the outlet walls of the grooves extends on either side of the equatorial plane of the tire for a portion having a width of from 10% to 35% of the axial development of said tread band.

Still more preferably, such equatorial zone extends on either side of the equatorial plane of the tire for a portion having a width of from 25% to 30% of the axial development of the tread band.

Preferably, the inclination of the outlet walls of the grooves, i.e. the value of angle ($\alpha'$), is substantially constant within the equatorial zone of the tread band, as specified hereinabove.

It has in fact been found that such feature contributes to achieve, in the very tread zone more stressed during braking, the rigidity of the rubber blocks necessary to obtain a substantial reduction in the aforementioned phenomena of wearing irregularity, accompanied by a quick degradation of the outlet edges of the grooves and loss of braking capacity of the tire.

At the opposite side portions of the tread external to said equatorial zone, on the contrary, the value of angle ($\alpha'$) linearly reduces as one moves away from the equatorial plane (X—X), and according to the chord of the tire, down to a minimum value of from 90° to 100°, which value is reached near opposite end portions of the tread band.

In other words, the inclination of the outlet walls of the grooves progressively increases with respect to plane (π) tangent to their bottom, until it is reached—only and solely in correspondence of opposite end portions of the tread band—the configuration of "substantial perpendicularity" shown by the grooves formed on the tires of the prior art throughout the whole axial development of the tread band.

Since the length of the grooves, according to the special tread pattern one wants to realize, may also be shorter than the whole axial development of the tread band, it ensues that the inclination of the outlet wall of the grooves takes a predetermined value, in accordance with the variation rule defined hereinabove, depending on its position (equatorial zone rather than side zones) on said tread band.

This means that the aforementioned variation in the inclination of the grooves inlet walls from 130° to 90° will take place only for those grooves having such a length as to span along the whole axial development of the tread band, while for those grooves positioned only in the side zones of the tread band and having such a length as to be outside of the equatorial zone, the variation of the values of α', inversely proportional to the inclination of the outlet walls with respect to plane π, may be limited to a range from, for instance, a maximum value of 115° (minimum inclination of the wall) to a minimum value of 95° (maximum inclination of the wall) as one moves away from the equatorial plane of the tire.

According to a preferred feature of the invention, furthermore, in the equatorial zone of the tread band, the inlet wall of the grooves formed in the tread band is inclined with respect to their bottom towards the rolling direction of the tire and forms, with respect to a plane (π) tangent to said bottom, an angle (α) of from 80° to 90°.

In other words, the inlet walls of the grooves show in the equatorial zone of the tread band a configuration of "substantial perpendicularity" which imparts to the rubber block upstream thereof the mobility necessary to ensure an adequate road holding.

In the same way as has been illustrated hereinabove with reference to angle α' formed by the outlet wall of the grooves, angle a as well is preferably substantially constant throughout the whole equatorial zone of the tread band.

In accordance with a further preferred feature of the invention, the angle α formed by the inlet wall of the grooves linearly decreases as one moves away from the equatorial plane (X—X), and according to the chord of the tire in the opposite side zones of the tread band external to said equatorial zone, down to a minimum value of from 50° to 80°, reached at opposite end portions of the tread band.

Preferably, said angle α is between 60° and 70° and, still more preferably, it is equal to about 65°.

In other words, the inlet walls of the grooves progressively reduce their inclination with respect to the plane (π) tangent to their bottom and towards the tire rolling direction, until they reach, at opposite side zones of the tread band, a configuration "symmetrical" to that shown by the grooves of the equatorial zone of the tread band.

In this way, an optimum rigidity of the rubber blocks positioned upstream of the grooves, which—coupled with the mobility of the downstream positioned rubber blocks—causes both an adequate directional stability and an adequate road holding of the tire, has been achieved in the side zones of the tread band.

In a further embodiment of the invention, it has been found that, by making the carcass beads of aramidic fiber, a tire structure is obtained that has an improved flexibility of the beads which makes the operation of mounting the tire on the rim easier.

Further characteristics and advantages will be more readily apparent by the following description of a preferred embodiment according to the invention, solely provided by way of non limiting indication, reference being made to the attached drawings.

BRIEF DESCRIPTION OF THE DRAWINGS

FIG. 5 shows a diagram of the preferred rule of variation of angles α and α', formed by the inlet and outlet walls of the grooves as a function of the distance from the equatorial plane measured along the chord of the tire of FIG. 1;

FIGS. 6a–6c show enlarged scale cross-sections of a groove of the tire of FIG. 1, taken at the equatorial plane and, respectively, at opposite end portions of the tread band of the tire of FIG. 1;

DETAILED DESCRIPTION OF THE INVENTION

Figure 1:
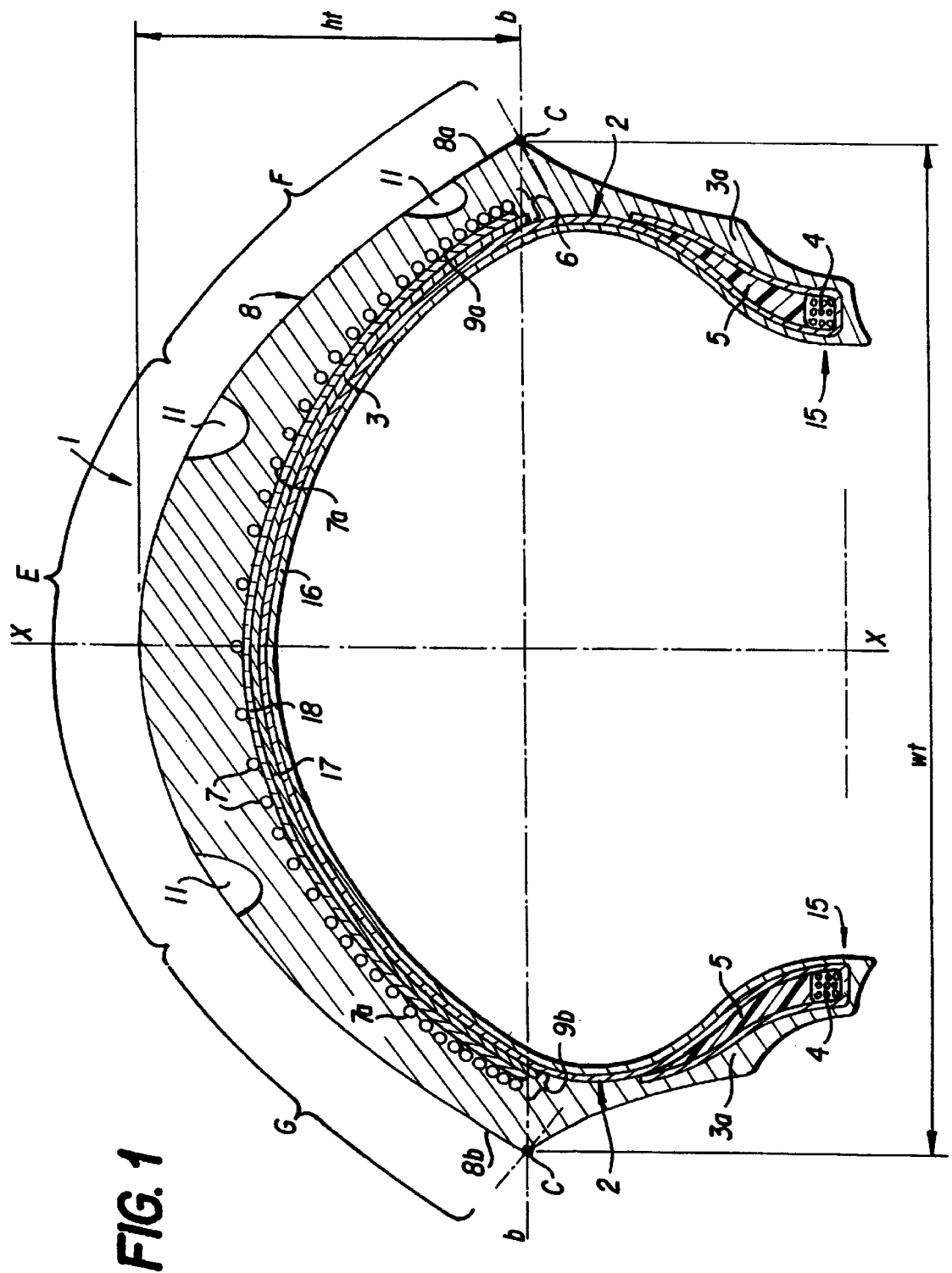
FIG. 1 shows a cross-section view of a tire according to the invention, taken along line I—I of FIG. 2.

In FIG. 1, 1 indicates a high-transverse-curvature tire intended for two-wheeled vehicles, in particular to be mounted on the front wheel of a motor-vehicle.

As is known, in order to have a good directional stability and a good controllability of the vehicle, the front tire must have a section of reduced width, which gives rise to the need of a high transverse curvature of the tread band.

The amount of this transverse curvature is defined by the specific value of the ratio between distance ht (measured along the equatorial plane X—X) of the tread crown from line b—b passing through ends C of the tread band, and distance wt measured along the chord of the tire between said ends.

If the tread ends cannot be easily identified, for instance due to lack of a precise reference such as the corner indicated by C in FIG. 1, the value of the tire maximum chord may be assumed as distance wt.

As has already been said, this ratio is called curvature ratio of the tread band.

The curvature ratio for front tires of motor-vehicles is usually greater than 0.3 and in any case always greater than that of the corresponding rear tire which has a curvature ratio usually not smaller than 0.15.

Tire 1 comprises a carcass structure 2 having a central crown portion 16 comprising at least a carcass ply 3 defining two sidewalls whose side edges 3a are turned around respective bead cores 4.

On the external peripheral edge of bead cores 4 an elastomeric filling 5 is applied which fills the space defined between the carcass ply 3 and the corresponding folded-back side edge 3a of the carcass ply 3.

As is known, the tire zone comprising the bead core 4 and the filling 5 forms the so-called bead, globally indicated by 15, intended for anchoring the tire onto a corresponding mounting rim, not shown.

A belt structure 6, which comprises at least one radially external layer 9a and preferably at least one radially internal layer 9b, both comprising structure reinforcing elements, is coaxially associated to said carcass structure 2.

More precisely, the reinforcing elements of the radially external layer 9a are cords 7, or at least a cord or a strip of a few cords (preferably 2 to 5) spirally wound on the central crown portion 16, from one end to the other of the carcass structure 2.

According to such an arrangement, cords 7 form a plurality of circumferential coils 7a, substantially oriented according to the rolling direction of the tire, which direction is usually called at "zero degree" with reference to its position with respect to the equatorial plane X—X of the tire.

Preferably, the cord coils 7a are wound on the carcass structure 2 according to a variable pitch, and with a variable density increasing from the center towards the ends of the belt structure 6, as will appear more clearly hereinbelow.

Even though the spiraling by itself and the pitch variability involve a winding angle different from zero, this angle remains so small that it may substantially be considered as always equal to zero degrees.

It is here specified that the following description will always refer to cords, which term is intended to indicate also elementary wires or untwisted yarns, whenever the text will allow.

It is also pointed out that a constant winding pitch along the perimeter extension of the belt structure 6 gives rise in any case to a variable density in an axial direction by effect of the curvature of the carcass structure 2.

In a preferred embodiment, said cords 7 are the well-known high elongation (HE) metallic cords, the use and features of which have already been widely described for instance in European Patent No. 0 461 464 of the same Applicant.

Preferably, such cords are made of high-carbon (HT) steel wires, i.e. steel wires with a carbon content higher than 0.9%. In particular, in a specific prototype prepared by the Applicant, the helical winding of the layer of circumferential cord coils 7a consists of a single cord 7, known as 3×4×0.20 HE HT, spiraled from one end of the belt to the other. The above description defines a metal cord formed of three strands each consisting of four elementary wires wound in the same direction as the strands and having a diameter of 0.20 mm; as is known, the abbreviation HE means "high elongation" and the abbreviation HT means "high tensile" steel, i.e. high carbon content steel.

Such cords have an ultimate elongation of from 4% to 8%, and a typical behavior to tensile stress, the well known and so called "spring behavior".

As to the different techniques for winding the cords around the carcass, these too are well known and since they do not form part of the invention they are not illustrated herein.

Clearly, the preferred use of metal wires does not exclude, for the purposes of the invention, the use of other cords, in particular the likewise known textile cords made of aramidic fiber, commercially known as Kevlar®, registered Trademark of DuPont.

Preferably, the distribution density of the cord coils 7a progressively changes along the layer, from the equatorial plane X—X towards the ends, preferably according to a predetermined relation.

In a particularly advantageous embodiment, the aforesaid relation keeps to a substantially constant value the product of the mass of the cord coils arranged within a unitary portion of given value along the whole axial development of the belt by the square of the distance between the center of said portion and the rotation axis r-r of the tire, so that during tire rotation the resulting centrifugal forces in each of said portions have all the same value, causing a uniform tension state from one end to the other of the belt.

Preferably, the axial distribution density of the cord coils is determined by the following relation:

$$N_x = K \frac{R^2}{r^2} N_0$$

wherein:

$N_0$ is the number of cord coils arranged in a central portion of unitary length located on either side the equatorial plane;

R is the distance between the center of said portion and the rotation axis of the tire;

r is the distance between the center of the unitary portion between the equatorial plane and the axial ends of said radially external layer and the rotation axis of the tire;

K is a parameter that takes into account the constituent material and the cord formation, as well as the amount of rubber around the cord and the weight of the radially-internal layer portion at said unitary portion, which is variable with variations in the material type and structural features of the belt strips along the crown profile that diverge from a reference value.

This parameter K may take a value substantially close to 1 if the cords have the same formation and all the connected materials are the same throughout the layers, or different values according to variations in the materials and formation of the reinforcing elements along the peripheral extension of the belt structure.

Solely by way of example, a zero-degree cord layer might be devised comprising textile cords (of aramid) in central position and metal cords (HE) in the adjoining side portions, and vice-versa.

Clearly, those skilled in the art may find other relations which, according to the aforementioned design variables, would allow to achieve at the same time a differentiated stiffness along the axial direction and a stress uniformity in the belt structure of the running tire, by varying in a controlled manner the density of the above cords.

Preferably, the winding density of the zero-degree cords in the area located on either side of the equatorial plane, where the maximum thinning out takes place, is not greater than 8 and more preferably is between 3 and 6 cords/cm.

The axial width of said zone varies preferably from 10% to 30% of the axial development of the belt.

Preferably, the quantity of cords in said central area is equal to a value between 60% and 80% of the quantity of cords near the tire shoulders, where the density of said cords is preferably not greater than 10 and more preferably included between 6 and 8 cords/cm.

Turning now to consider the radially internal layer 9b of the belt structure 6, different alternative embodiments are possible, among which those skilled in the art may choose the most suitable one according to specific individual requirements.

First of all, the layer 9b may comprise two strips 17, 18 of rubberized fabric provided with reinforcing elements incorporated in an elastomeric matrix, oriented according to two preferred directions crossing each other in the two strips and preferably symmetrically inclined in relation to the equatorial plane X—X, substantially in the same manner as the traditional belts of the prior art.

The substantial difference with respect to the latter belt resides in a more reduced stiffness of the present belt at a wide zone a (of from 10% to 30% of the axial width of the belt) on either side of the equatorial plane (see FIGS. 3 and 4); said more reduced stiffness may be conveniently achieved by acting either on the thickness of said reinforcing elements or on the constituent material or on their orientation with respect to the equatorial plane or on any combination of the above expedients.

This stiffness value may be expressed in different ways, for instance by the thickness of said reinforcing elements (all other conditions being equal), but more generally it is expressed by the modulus of elasticity or ultimate tensile stress of said radially internal layer 9b of the belt structure 6, measured in the circumferential direction of the tire; said layer 9b preferably has a stiffness that does not exceed 65% of the stiffness of the equivalent belts in the prior art.

Figure 3:
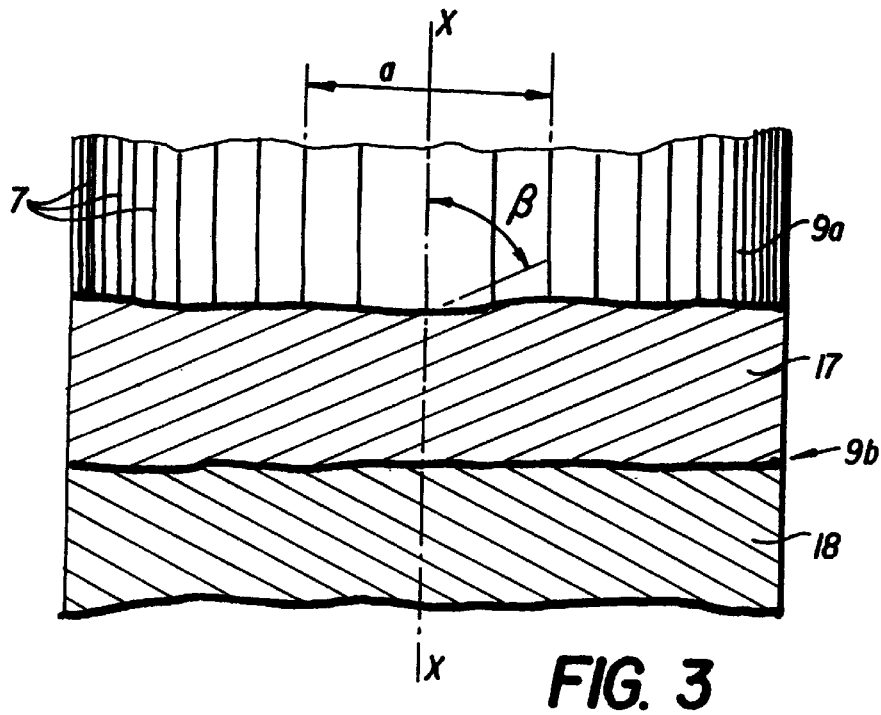
FIG. 3 shows a simplified diagrammatic plan view of a belt structure portion in the absence of the underlying carcass, in a first convenient embodiment.

In particular—the material, structure and lying angles being equal—the overall thickness of the reinforcing elements crossing a right section of unitary width, on either side of the equatorial plane, in an oblique direction relative to said plane, as shown in FIG. 3, does not exceed and preferably is lower than the usual thickness of traditional belts, which, as is known, is in the order of 14 cords/cm.

The angles ($\beta$) formed by said cords relative to the equatorial plane (X—X) are between 18° and 50° and preferably between 22° and 45°.

According to an advantageous embodiment, said superposed strips 17, 18 are interrupted at the equatorial plane X—X, giving rise to a zone a of width of from 10% to 30% of the axial extension of said belt, in which zones only circumferentially-directed reinforcing cords 7 are present.

The end edges of said strips are in a stepped relationship, as currently occurs in the art.

The above described embodiment has the advantage of allowing to choose in the aforesaid strips 17, 18 suitable thickness values for the side portions of the belt structure 6 without correspondingly thickening the central crown portion 16of the same.

In particular it was found that for nylon cords having title 940/2, thickness values of from 4 to 8 cords/cm were appropriate in combination with orientation angles relative to the radial direction of from 30° to 50°.

Preferably, the reinforcing elements of said strips are monofilaments and/or twisted or untwisted yarns and their cords are made of varied textile materials, for example natural fibers, as rayon or cotton, synthetic fibers, such as polyamide, nylon or aramid, or even of metal.

In a preferred embodiment, both strips 17, 18 comprise cords of the same material, whereas in a further embodiment the cords of one strip are made of a different material from that of the other strip, nylon-aramid or aramid-metal combinations being for example selected; in this case, the angles ($\beta$) of said cords, included within the aforesaid range, are preferably different from one another and not symmetrical.

Figure 4:
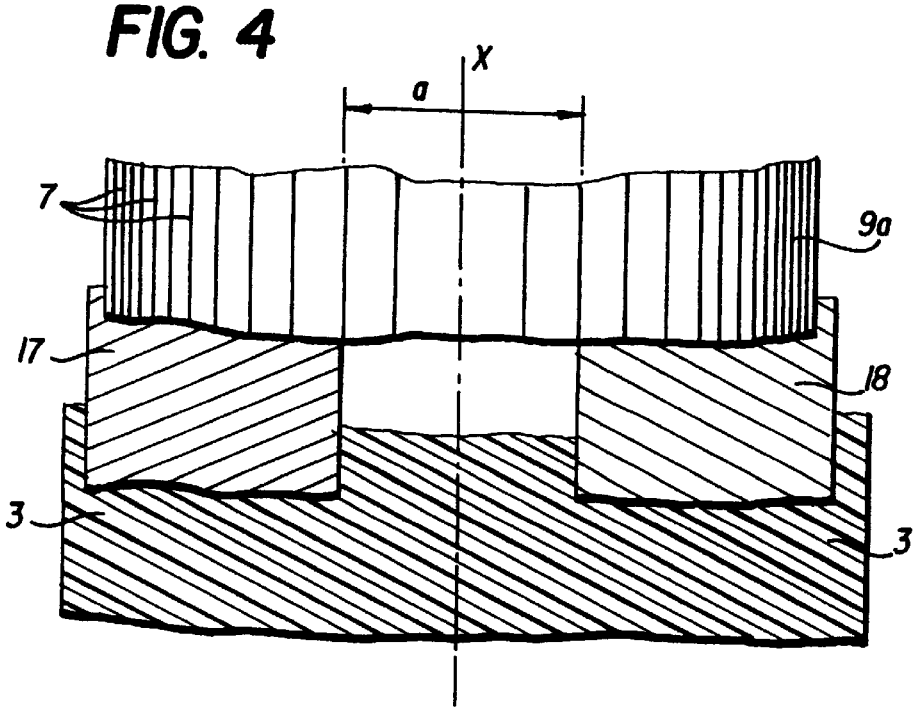
FIG. 4 shows a view, similar to that of FIG. 3, of a different alternative embodiment of the radially internal layer of said belt structure.

In an alternative solution, shown in FIG. 4, the radially internal layer 9b is formed of two strips 17, 18 axially arranged side by side along the peripheral profile, each of them being provided with reinforcing elements oriented in a crossed direction inclined with respect to the equatorial plane, so that the two strips give rise to a substantially herringbone configuration of the reinforcing elements.

In this case too, the two side-by-side strips may be kept close to each other or also joined along their facing longitudinal edges, or completely separated. In this case, it is useful for the facing edges to keep the same axial width mentioned above in the case of the superposed strips. There may also be two strips radially superposed with the strips 17, 18, provided with reinforcing elements oriented in a crossed direction relative to the direction of the reinforcing elements in the strips 17, 18 with respect to the equatorial plane of the tire.

The previous remarks in connection with the constituent material, orientation and thickness of the reinforcing elements of said two strips also apply to the individual strips as described just above.

In a further advantageous embodiment of the invention, said radially internal layer 9b consists of a sheet of elastomeric material, either axially continuous or interrupted at the equatorial plane X—X, as already described, charged with a reinforcing filler consisting of short discontinuous fibers optionally randomly dispersed within the elastomeric matrix, but preferably substantially oriented in an axial direction or a direction inclined with respect to the equatorial plane X—X, symmetrical with the direction of the adjacent sheet portion.

In this case, one can no longer speak of fiber thickness but should consider their distribution density per unit volume: this density is preferably between 0.5% and 5% of the overall volume.

Conveniently, said fibrous reinforcing fillers are made of a material selected from the group comprising textile, metal, glass fibers or short fibers formed with fibrils of aramid.

For the purposes of the invention, the use of short aramid fibrillated fibers, better known as "aramid pulp" or "Kevlar®-pulp", has proven advantageous.

A tread band 8, by means of which the tire 1 gets in touch with the ground, is applied in a known manner onto the belt structure 6 described hereinabove.

Figure 2:
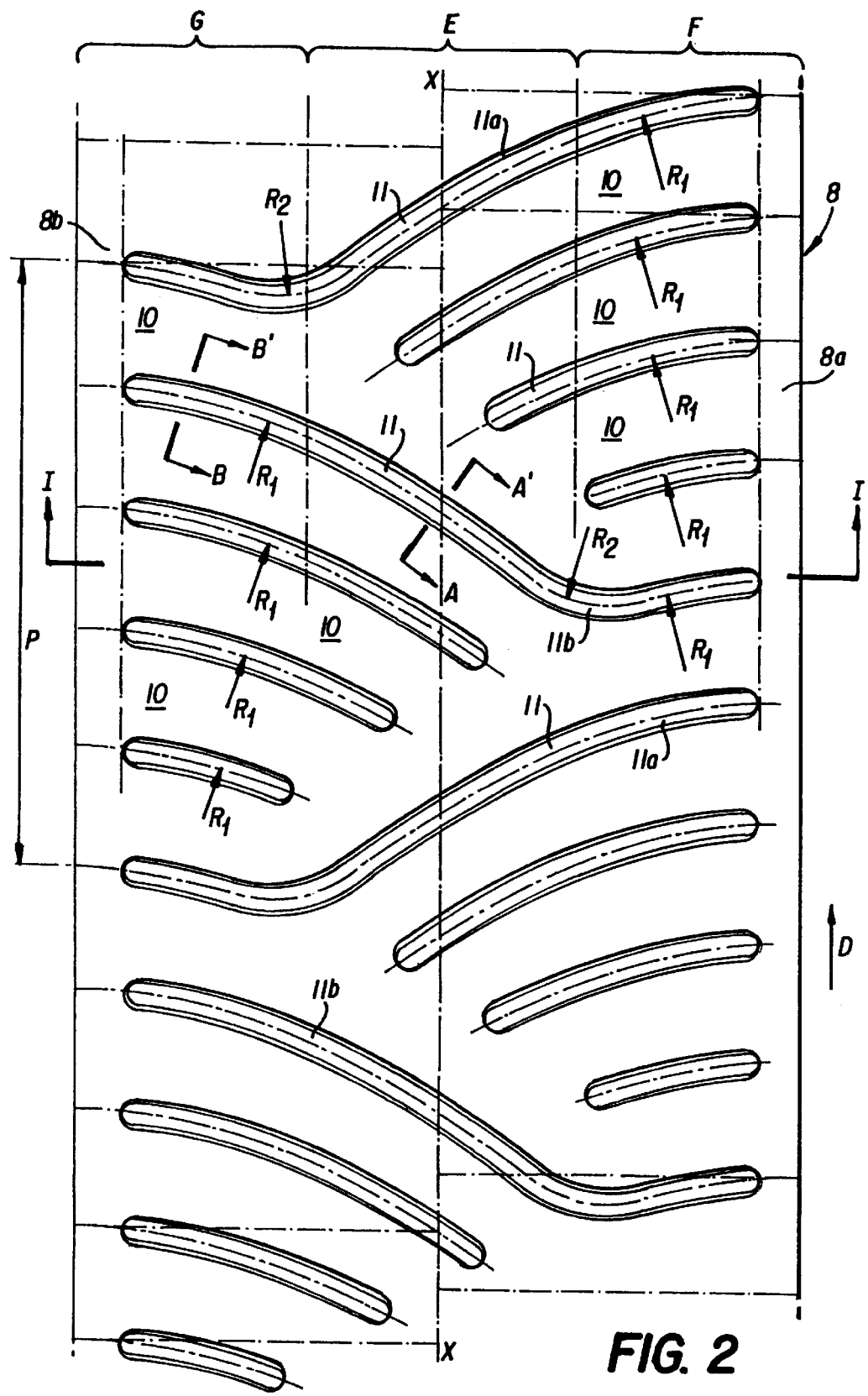
FIG. 2 shows a plan development of a portion of the tread band of a tire according to the invention.

The tread band 8 comprises a plurality of rubber blocks, all indicated by reference 10, defined between a plurality of grooves 11 extending in a direction substantially transverse to the running direction of the tire, indicated by arrow D in FIG. 2, the tread band 8 being free from any groove extending along a direction substantially parallel to the running direction D of the tire.

For the sake of convenience, the term: rubber block, is used in this description to indicate an elongated portion of the tread band 8 extending in a prevailing axial direction and between two subsequent grooves 11.

Each of said grooves 11 comprises in its turn a bottom 12 connected to opposite inlet and outlet sideswalls 13, 14 having a predetermined inclination with respect to the bottom 12 according to the position considered along the axial development of the tread band 8.

More particularly, according to the invention, the inclination of the inlet and outlet sideswalls 13, 14 of the grooves 11 has a constant and predetermined value in an equatorial zone of tread band 8 indicated by E in FIGS. 1 and 2.

Preferably, such equatorial zone E of the tread band 8 extends on either side of the equatorial plane X—X of tire 1 for a width of from 10% to 35% of the axial development of said tread band.

Still more preferably, the equatorial zone E extends on either side of the equatorial plane X—X of the tire for a length of from 25% to 30% of the axial development of the tread band 8.

Figure 7:
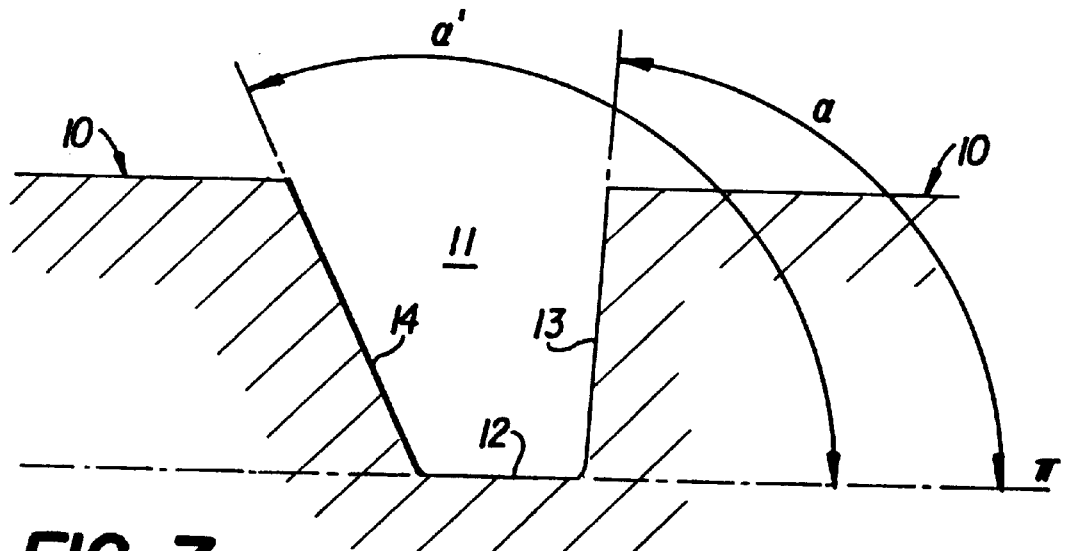
FIGS. 7 and 8 show respective cross-sections of a groove, taken in different positions along the axial development of the tread band, along lines A-A' and B-B' of FIG. 2.

In the equatorial zone E, the inlet wall 13 of the grooves 11 is inclined towards the rolling direction of the tire and forms, with respect to a plane π tangent to bottom 12, an angle a varying from 80° to 90° (FIG. 7).

As described hereinabove and illustrated in FIGS. 7 and 8, the angular values defining the inclination of inlet and outlet lateral walls 13, 14 of the grooves 11 all measured starting from the above plane π tangent to the bottom 12 of said grooves will be all measured in counterclockwise direction.

According to a preferred embodiment shown in FIG. 7, the inlet wall 13 of the grooves 11 forms, with respect to plane π, an angle a equal to about 85°.

In other words, the inlet wall 13 of the grooves 11 forms, with respect to a plane perpendicular to the bottom 12, an angle equal to about 5°.

In the equatorial zone E of tread band 8, the outlet wall 14 of the grooves 11 is, instead, inclined towards a direction opposite to the rolling direction of the tire (i.e. towards the left side, with reference to FIG. 7) and forms, with respect to plane π, an angle α' of from 100° and 130°.

According to a preferred embodiment shown in FIG. 7, the outlet wall 14 of the grooves 11 forms, with respect to π, an angle α' equal to about 115°.

In other words, the outlet wall 14 of the grooves 11 forms, with respect to a plane perpendicular to the bottom 12, an angle equal to about 25° measured in the direction opposite to the rolling direction of the tire.

According to the invention, in opposite side zones F, G of the tread band 8, external to said equatorial zone E, the inclination of the inlet and outlet sideswalls 13, 14 of the grooves 11 varies linearly—as a function of the chord of tire 1—as one moves away from the equatorial plane X—X, approaching opposite end portions 8a, 8b of the tread band 8.

Figure 8:
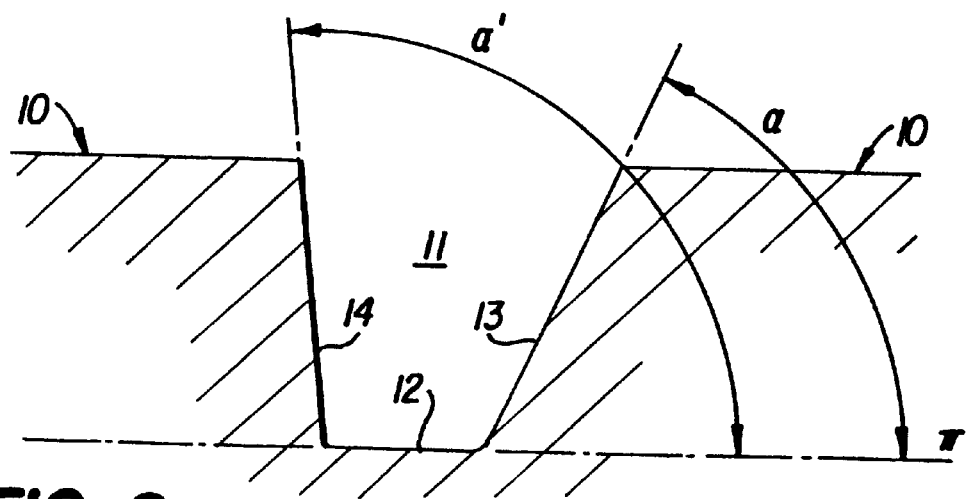

More particularly, angle α—formed by the inlet wall 13 of the grooves 11 with respect to plane π tangent to bottom 12—linearly decreases according to the chord and reaches a value of from 50° to 80° at the end portions 8a, 8b of tread band 8 (see FIG. 8).

In other words, in the opposite side zones F, G of the tread band 8, the inclination with respect to plane π of the inlet wall 13 of the grooves 11 linearly decreases until it reaches the minimum inclination at said end portions 8a, 8b.

Preferably, at the end portions 8a, 8b, the inlet wall 13 of the grooves 11 forms, with respect to plane π, an angle equal to 65°, i.e. it forms, with respect to a plane perpendicular to the bottom 12, an angle equal to about 25° (see FIG. 8).

The preferred variation rule of angle a as a function of the distance from the equatorial plane X—X of tire 1 measured along the chord of the same (indicated by wt), is graphically shown in FIG. 5.

Clearly, only those grooves 11 spanning along the whole axial development of the tread band 8 will be concerned by an inclination variation of the inlet walls 13 within the whole range of values as defined hereinabove, while for those grooves 11 positioned in side zone F, G of the tread band 8 and whose length does not touch upon the equatorial zone E, the variation of angle a may be limited to an interval ranging from a minimum value of 50° and a maximum value of 80° as one approaches the equatorial plane X—X.

According to the invention, the angle α'—formed by the outlet wall 14 of the grooves 11 with respect to plane π tangent to bottom 12—linearly decreases as a function of the chord of the tire in the side zones F, G of the tread band 8 and reaches a value of from 90° to 100° at the end portions 8a, 8b of the tread band 8 (FIG. 8).

In other words and as may be easily understood from FIGS. 7 and 8, in the side zones F, G of the tread band 8, the inclination of the outlet wall 14 of the grooves 11 linearly increases with respect to plane π and in a direction opposite to the rolling direction of the tire, as one moves away from the equatorial plane, until it reaches the maximum inclination at the aforesaid end portions 8a, 8b.

Preferably, at the end portions 8a, 8b, the outlet wall 14 of the grooves 11 forms, with respect to plane π, an angle α' equal to 95°, i.e. an angle equal to about 5° with respect to a plane perpendicular to the bottom (FIG. 8).

In this case too, only those grooves 11 spanning along the whole axial development of the tread band 8 will be concerned by an inclination variation of the outlet walls 14 within the whole range of values defined hereinabove, while for those grooves 11 positioned in the lateral zones F, G of the tread band 8 and having a length that does not touch upon the equatorial zone E, the variation of angle α' may be limited to an interval ranging from a maximum value of 130° down to a minimum value of 100° as one approaches the equatorial plane X—X.

The preferred variation rule of the angle α' as a function of the distance from the equatorial plane X—X of tire 1 measured along the chord of the same (indicated by wt) is graphically shown in FIG. 5.

FIGS. 6A–6C, on the other hand, show as many cross-sections of the grooves 11 taken along the equatorial zone of tire 1 and along the end portion 8a, 8b of the tread band 8.

In a preferred embodiment of tire 1, shown in FIG. 2, the grooves 11 transversely extend through the tread band 8 according to a curvilinear path substantially parallel to the so-called wear waves (otherwise known by the term "Schalamack waves") of the same tread band.

To this aim, the grooves 11 have at least a curvature center positioned upstream thereof in the opposite side zones F, G of the tread band 8, which zones are external to the equatorial zone E defined hereinabove.

In such side zones F, G the grooves 11 have a curvature radius $R_1$ ranging from 120 to 180 mm, preferably between 140 and 160 mm and still more preferably equal to about 150 mm.

Preferably, in a portion of the tread band 8 having a length equal to the pitch of the tread pattern, the tire 1 of the present invention comprises at least one groove, preferably a couple of grooves 11a, 11b, extending substantially throughout the whole axial development of the tread band 8 according to a curvilinear, substantially double-inflected path.

Each of said grooves 11a, 11b includes opposite lateral portions having respective curvature centers positioned upstream thereof and on opposite sides with respect to the equatorial plane X—X of tire 1 (FIG. 2).

In this case too, the opposite lateral portions of the grooves 11a, 11b having a double-inflection path—lying in the opposite side zones F, G of the tread band 8—preferably have a curvature radius of from 120 to 180 mm, preferably between 140 and 160 mm and still more preferably equal to about 150 mm.

Besides, according to a further preferred feature of the invention, at least one of the lateral portions of the grooves 11a, 11b having a double-inflection path transversally extends along the tread band 8 through substantially the whole equatorial zone E of tire 1 and substantially the whole of one of the side zones F, G of the tread band.

More precisely, in the present example, the groove 11a comprises a lateral portion extending substantially throughout the whole width of the equatorial zone E and the whole width of the side zone F, while the groove 11b shows a specular conformation with respect to the equatorial plane X—X and comprises a lateral portion extending substantially throughout the whole width of the equatorial zone E and the whole width of the opposite side zone G.

Preferably, the opposite lateral portions of grooves 11a, 11b are connected through an intermediate portion transversely extending along the tread band 8 outside of the equatorial zone E and in at least part of the side zones F, G, having a curvature center positioned downstream of said groove.

More precisely, in the present example, the intermediate portion of groove 11a extends between the equatorial plane X—X and a part of the side zone G, while the intermediate portion of groove 11b extends between the equatorial plane X—X and a part of the opposite side zone F.

Preferably, such intermediate connecting portion has a curvature radius $R_2$ of from 20 and 40 mm and still more preferably equal to about 30 mm.

Repeated tests carried out by the Applicant have shown that the tires according to the invention, besides solving the problem of improving the wet grip and increasing the wear resistance and along therewith the kilometric yield of the tire tread, also achieve a number of advantages as compared to the tires of the prior art.

Among them, the following may be mentioned:

a) possibility of reducing the tire weight, and along therewith, reducing the disturbing effects on vehicle trim caused by impacts or ground roughness, as well as reducing the braking distance because of the lower inertia of the tire;

b) a greater wear uniformity of the tire tread, with ensuing advantageous increase in road holding of the same;

c) an increased thermal stability of the rubber blocks formed on the tread band;

d) a lower rolling resistance of the tire, with ensuing wear reduction;

e) an improved capacity of the tire of draining off the water present under the ground-contacting area (aquaplaning).

Lastly, thanks to the adoption of a belt structure with zero-degree cords, the tires of the invention allow to design the tread band pattern without those constrictions in the choice of the solid/hollow area ratio which limit the form and position of the grooves in the tires of the prior art.

The ensuing design freedom allows not only to improve the performances of the tire as has already been described hereinabove, but also to obtain tread patterns having excellent characteristics also from an aesthetic point of view, with all the resulting commercial advantages.

Obviously, those skilled in the art may introduce variants and modifications in the above described invention, in order to satisfy specific and contingent requirements, which variants and modifications fall anyhow within the scope of protection as is defined by the appended claims.

We claim:

1. A tire for two-wheeled vehicles having a curvature ratio not lower than 0.3, comprising:
    a carcass structure (2) of toric form having a high transverse curvature and provided with a central crown portion (16) and two sidewalls ending in a couple of beads (15) for anchoring on a corresponding mounting rim;
    a belt structure (6), circumferentially inextensible, coaxially extended around the carcass structure (2);
    a tread band (8) coaxially extended around the belt structure (6) and comprising a plurality of rubber blocks (10) defined between a plurality of grooves (11) extending along a direction substantially transverse to the running direction of the tire, said tread band (8) being free from any groove extending along a direction substantially parallel to the running direction of the tire, said grooves (11) comprising a bottom (12) connected to opposite inlet (13) and outlet (14) sidewalls extending substantially perpendicularly to said bottom (12) such that said sidewalls (13, 14) form with respect to a plane perpendicular to said bottom (12) an angle varying from 0° to 40°;
    wherein:
    a) said belt structure (6) comprises at least a radially external layer (9a) including a plurality of circumferential coils (7a), axially arranged side by side, of a cord (7) wound at a substantially zero angle with respect to the equatorial plane (X—X) of the tire;
    b) the area occupied by said rubber blocks (10) in a portion of the tread band (8) having a length equal to a pitch (p) of the tread pattern and a width equal to the axial development of the tread band (8) is between 70% and 90% of the total area of said portion; and
    c) said grooves (11) transversely extend along the tread band (8) according to a curvilinear path substantially parallel to the wear waves of the tread band (8).

2. A tire according to claim 1, wherein the area occupied by said rubber blocks (10) in said portion of the tread band (8) having a length equal to the pitch (p) of the tread pattern and a width equal to the axial development of the tread band (8) is between 80% and 85% of the total area of said portion.

3. A tire according to claim 1, wherein said cord coils (7a), arranged at a substantially zero angle with respect to the equatorial plane (X—X) of the tire, are distributed with a variable density along the axial development of said belt structure (6).

4. A tire according to claim 3, wherein the density of said cord coils (7a) progressively increases from said equatorial plane (X—X) towards the ends of the belt structure (6), said density having a value not greater than 8 cords/cm in a zone located on either side of the equatorial plane (X—X).

5. A tire according to claim 4, wherein the density according to which said cord coils (7a) are distributed is given by the following relation:

$$Nx = K \frac{R^2}{r^2} No$$

wherein:
    No is the number of cord coils (7a) arranged in a central portion of unitary width located on either side the equatorial plane (X—X);
    R is the distance between the center of said portion and the rotation axis of the tire;
    r is the distance between the center of the unitary portion between the equatorial plane and the axial ends of said radially external layer and the rotation axis of the tire;
    K is a parameter that takes into account the constituent material and the cord formation, as well as the amount of rubber around the cord and the weight of the radially-internal layer portion at said unitary portion, which is variable with variations in the material type and structural features of the belt strips along the crown profile that diverge from a reference value.

6. A tire according to claim 1, wherein said belt structure (6) further comprises a reinforcing layer (9b) in a radially internal position.

7. A tire according to claim 6, wherein said radially internal layer (9b) is interrupted at the equatorial plane (X—X) of the tire over a portion having a width of from 10% to 30% of the axial extension of said belt structure (6).

8. A tire according to claim 6, wherein said radially internal layer (9b) is essentially consisting of a sheet of elastomeric material, interposed between the belt structure (6) and the carcass structure (2), said sheet comprising binding agents dispersed in the elastomeric material thereof.

9. A tire according to claim 6, wherein said radially internal layer (9b) of the belt structure (6) comprises two strips (17, 18), axially arranged side by side, provided with reinforcing elements oriented in each strip in a crossed direction relative to the direction of the reinforcing elements in the other strip and inclined with respect to the equatorial plane (X—X) of the tire.

10. A tire according to claim 9, wherein said radially internal layer (9b) comprises on each side of the equatorial plane two radially superposed strips (17, 18), provided with reinforcing elements oriented in each strip (17, 18) in a crossed direction relative to the direction of the reinforcing elements in the other strip and inclined with respect to the equatorial plane (X—X) of the tire.

11. A tire according to claim 10, wherein the reinforcing elements in one of said strips (17, 18) are of a material different from the material of the reinforcing elements in the adjacent strip in the radial direction.

12. A tire according to claim 1, comprising at least one groove (11a, 11b) extending along substantially the whole axial development of the tread band (8) according to a substantially double-inflection curvilinear path, including opposite lateral portions having respective curvature centers positioned upstream of said groove (11a, 11b) and on opposite sides with respect to said equatorial plane (X—X) of the tire.

13. A tire according to claim 1, wherein said grooves (11) have a curvature radius ($R_1$) of from 120 to 180 mm.

14. A tire according to claim 11, wherein in opposite side zones (F, G) external to an equatorial zone (E) of the tread band (8), said grooves (11) have at least a curvature center positioned upstream thereof.

15. A tire according to claim 13, wherein it comprises at least one groove (11a, 11b) extending along substantially the whole axial development of the tread band (8) according to a substantially double-inflection curvilinear path, including opposite lateral portions having respective curvature centers positioned upstream of said groove (11a, 11b) and on opposite sides with respect to said equatorial plane (X—X) of the tire.

16. A tire according to claim 15, wherein said opposite lateral portions have a curvature radius ($R_1$) of from 120 to 180 mm.

17. A tire according to claim 15, wherein at least one of said lateral portions of said at least one groove (11a, 11b) transversely extends through the tread band (8) along substantially the whole width of the equatorial zone (E) of the tread band(8) and the whole width of one of said side zones (F, G) of the tread band (8).

18. A tire according to claim 15, wherein the lateral portions of said at least one groove (11a, 11b) are connected through an intermediate portion having a curvature center positioned downstream of said groove (11a, 11b).

19. A tire according to claim 18, wherein said intermediate connecting portion transversely extends along the tread band (8) externally to said equatorial zone (E) and in at least a part of one of said side zones (F, G).

20. A tire according to claim 18, wherein said intermediate connecting portion has a curvature radius ($R_2$) of from 20 to 40 mm.

21. A tire for two-wheeled vehicles having a curvature ratio not lower than 0.3, comprising:

a carcass structure (2) of toric form having a high transverse curvature and provided with a central crown portion (16) and two sidewalls ending in a couple of beads (15) for anchoring on a corresponding mounting rim:

a belt structure (6), circumferentially inextensible, coaxially extended around the carcass structure (2);

a tread band (8) coaxially extended around the belt structure (6) and comprising a plurality of rubber blocks (10) defined between a plurality of grooves (11) extending along a direction substantially transverse to the running direction of the tire, said tread band (8) being free from any groove extending along a direction substantially parallel to the running direction of the tire, said grooves (11) comprising a bottom (12) connected to opposite inlet (13) and outlet (14) sidewalls extending substantially perpendicularly to said bottom (12) such that said sidewalls (13, 14) form with respect to a plane perpendicular to said bottom (12) an angle varying from 0° to 40°;

wherein:

a) said belt structure (6) comprises at least a radially external layer (9a) including a plurality of circumferential coils (7a), axially arranged side by side, of a cord (7) wound at a substantially zero angle with respect to the equatorial plane (X—X) of the tire;

b) the area occupied by said rubber blocks (10) in a portion of the tread band (8) having a length equal to a pitch (p) of the tread pattern and a width equal to the axial development of the tread band (8) is between 70% and 90% of the total area of said portion, and c) in an equatorial zone (E) of the tread band (8) the outlet sidewall (14) of said grooves (11) is inclined with respect to said bottom (12) towards a direction opposite to the rolling direction of the tire and forms with respect to a plane ($\pi$) tangent to said bottom (12) an angle ($\alpha'$) of from 100° to 130°.

22. A tire according to claim 21, wherein said angle ($\alpha'$) is between 110° and 120°.

23. A tire according to claim 21, wherein said angle ($\alpha'$) is substantially constant along said equatorial zone (E) of the tire.

24. A tire according to claim 21, wherein said equatorial zone (E) extends on either side of the equatorial plane (X—X) of the tire for a portion having a width of from 10% to 35% of the axial development of said tread band (8).

25. A tire according to claim 21, wherein at opposite side zones (F, G) of the tread band (8), external to said equatorial zone (E), said angle ($\alpha'$) linearly decreases according to the chord of the tire down to a minimum value of from 90° to 100°.

26. A tire according to claim 21, wherein in said equatorial zone (E) of the tread band (8) the inlet sidewall (13) of said grooves (11) is inclined with respect to said bottom (12) towards the rolling direction of the tire and forms with respect to a plane ($\pi$) tangent to said bottom (12) an angle ($\alpha$) of from 80° to 90°.

27. A tire according to claim 26, wherein said inlet sidewall angle ($\alpha$) is substantially constant along said equatorial zone (E) of the tire.

28. A tire according to claim 26, wherein at opposite side zones (F, G) of the tread band (8) external to said equatorial zone (E), said inlet sidewall angle ($\alpha$) linearly decreases according to the chord of the tire down to a minimum value of from 50° to 80°.

29. A tire according to claim 28, wherein said inlet sidewall angle ($\alpha$) is between 60° and 70°.

* * * * *